United States Patent

Liao et al.

[11] Patent Number: 5,758,803
[45] Date of Patent: Jun. 2, 1998

[54] MILK POWDER DISPENSER

[75] Inventors: Chin-Hai Liao, No. 51, Shui-Tou Lane, Sec. 2, Chung Ho St., Hsi-She Hsiang, Taichung Hsien; Wen-Pin Liao, Taipei Hsien, both of Taiwan

[73] Assignee: Chin-Hai Liao, Taipei, Taiwan

[21] Appl. No.: 699,783

[22] Filed: Aug. 20, 1996

[51] Int. Cl.⁶ ........................................ G01F 11/28
[52] U.S. Cl. .................. 222/440; 222/185.1; 222/449; 222/451; 222/46
[58] Field of Search .................. 222/425, 434, 222/435, 438, 439, 440, 448, 449, 450, 451, 185.1, 46; 141/370, 376

[56] References Cited

U.S. PATENT DOCUMENTS

| 360,608 | 4/1887 | McKinnon | 222/438 |
|---|---|---|---|
| 502,347 | 8/1893 | Cell et al. | 222/451 X |
| 981,707 | 1/1911 | Spencer | 222/438 X |
| 1,005,363 | 10/1911 | Thomas | 222/440 X |
| 1,337,440 | 4/1920 | Clappison | 222/438 X |
| 1,430,935 | 10/1922 | Bright | 222/451 X |
| 1,469,879 | 10/1923 | Bott | 222/440 X |
| 1,794,995 | 3/1931 | Voglsamer | 222/440 X |
| 2,041,887 | 5/1936 | Ward | 222/449 |
| 2,588,206 | 3/1952 | Clark | 222/449 X |
| 4,955,510 | 9/1990 | Newnan | 222/438 X |
| 5,097,707 | 3/1992 | Ford | 222/438 X |
| 5,685,461 | 11/1997 | Mitchell | 222/449 X |

FOREIGN PATENT DOCUMENTS 408385   4/1934   United Kingdom ............ 222/451

*Primary Examiner*—Kevin P. Shaver
*Attorney, Agent, or Firm*—Roger L. Tate; Baker & Botts LLP

[57] ABSTRACT

A milk powder dispenser for dispensing a predetermined amount of milk powder is provided. The dispenser includes a base unit, a milk powder measuring unit, and a control unit. The base unit includes a base plate formed with an opening. The milk powder measuring unit is mounted on a bottom side of the base plate and confines a milk powder retaining chamber that is aligned with the opening in the base plate. The control unit has a top wall formed with an inlet opening and extending slidably between the measuring unit and the base plate, and a bottom wall formed with an outlet opening and extending slidably below the measuring unit. The control unit is movable relative to the base unit and the measuring unit between a first position in which the inlet opening is aligned with the opening in the base plate and the retaining chamber is registered with the inlet opening, and a second position in which the opening in the base plate is closed by the top wall and the retaining chamber is registered with the outlet opening.

16 Claims, 5 Drawing Sheets

MILK POWDER DISPENSER

BACKGROUND OF THE INVENTION

1. Field of the Invention

The invention relates to a milk powder dispenser, more particularly to a milk powder dispenser for dispensing a predetermined amount of milk powder.

2. Description of the Related Art

Conventionally, a milk powder spoon is used to transfer milk powder into a milk bottle. In this way, milk powder is easily scattered here and there on the table and cannot be supplied precisely. Therefore, there is a need to provide a milk powder dispenser for dispensing milk powder precisely in a predetermined amount without scattering the milk powder on the table.

SUMMARY OF THE INVENTION

The main object of this invention is to provide a milk powder dispenser which is convenient to use, which dispenses milk powder precisely in a predetermined amount, and which does not scatter the milk powder.

Accordingly, the milk powder dispenser of the present invention includes a base unit, a milk powder measuring unit and a control unit. The base unit includes a horizontal base plate and a container for containing milk powder therein. The base plate has a middle portion formed with an opening. The container has an open bottom end connected axially to the base plate. The milk powder measuring unit is mounted on a bottom side of the base plate. The milk powder confines a milk powder retaining chamber that is aligned with the opening in the base plate. The control unit has a top wall, a bottom wall, and front and rear walls which interconnect front and rear ends of the top and bottom walls, respectively. The top wall is formed with an inlet opening and extends slidably between the measuring unit and the base plate. The bottom wall is formed with an outlet opening and extends slidably below the measuring unit. The inlet opening and the outlet opening are disposed adjacent to the rear and front ends, respectively. The control unit is movable relative to the base unit and the measuring unit between a first position in which the inlet opening is aligned with the opening in the base plate and the retaining chamber is registered with the inlet opening, and a second position in which the opening in the base plate is closed by the top wall and the retaining chamber is registered with the outlet opening. Milk powder in the measuring unit can be discharged from the outlet opening into a milk bottle provided below the base plate when the control unit is moved to the second position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
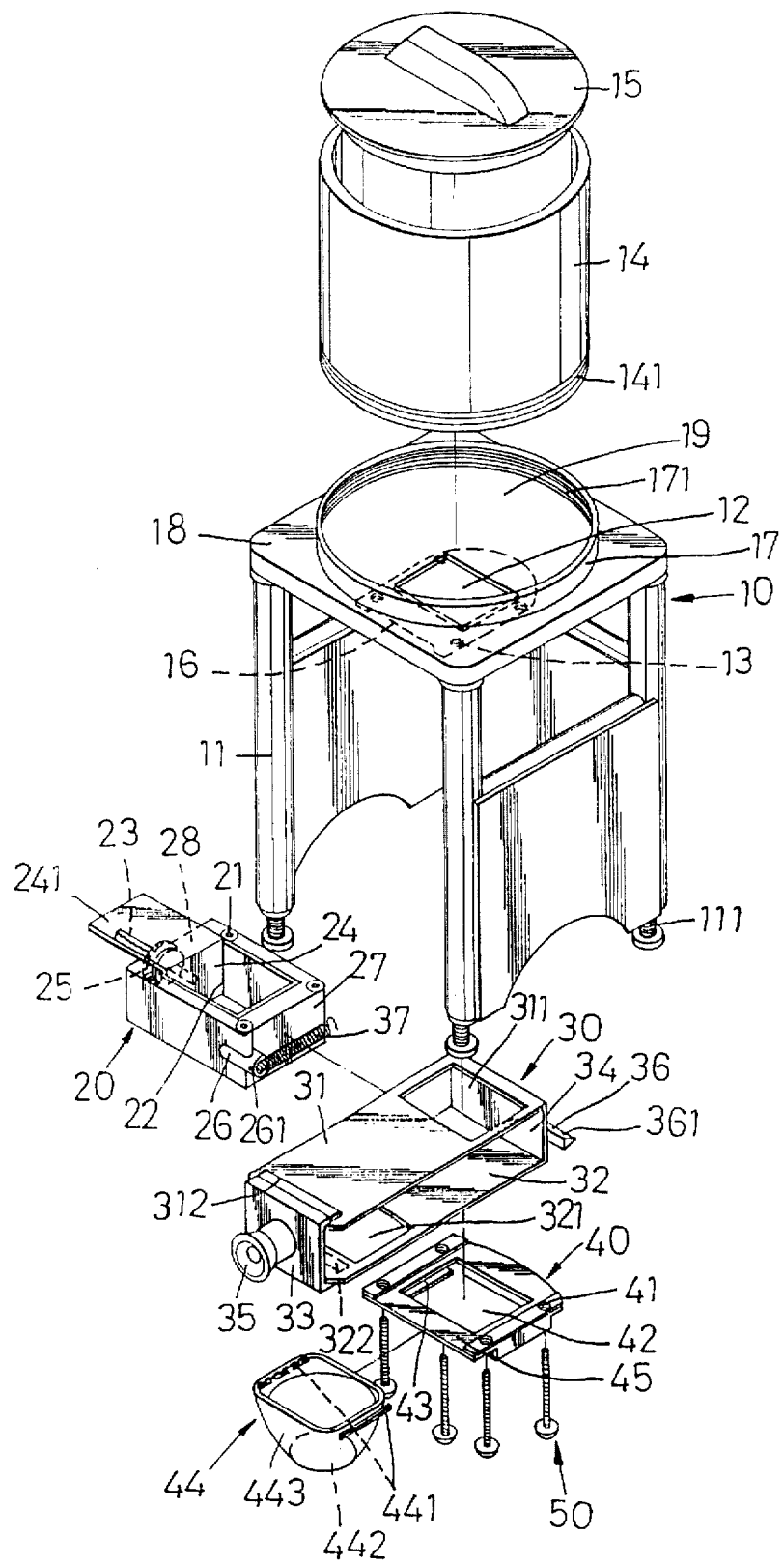
FIG. 1 is an exploded perspective view of a preferred embodiment of the milk powder dispenser of this invention.

Referring to FIG. 1, the preferred embodiment of the milk powder dispenser of this invention is shown to include a base unit 10, a milk powder measuring unit 20, a control unit 30, a plate member 40 and a guiding cup 44.

The base unit 10 is substantially rectangular in shape and is provided with four legs 11. Each of the four legs 11 is provided with a screw rod 111 for adjusting the height of the legs 11. The base unit 10 includes a horizontal base plate 18 which has a middle portion formed with a downwardly opening funnel section 19 that confines a rectangular opening 12. The periphery of the opening 12 is provided with a flat portion 16 formed with four spaced screw holes 13. The funnel section 19 of the base plate 18 is formed with an upwardly protruding annular flange 17 which is provided with an internal screw thread 171. The base unit 10 further includes a container 14 for containing milk powder therein. The container 14 has an open top end which is provided with a removable cap 15 and an open bottom end which is connected axially to the base plate 18. The open bottom end of the container 14 is formed with an external screw thread 141 which engages threadedly the internal screw thread 171 of the flange 17.

The milk powder measuring unit 20 is substantially rectangular in shape and has four corners formed with four through holes 21. The measuring unit 20 is mounted on a bottom side of the base plate 18 and confines a rectangular milk powder retaining chamber 22 that is aligned with the opening 12 in the base plate 18. The retaining chamber 22 is formed vertically through the measuring unit 20 and has a size corresponding to that of the opening 12. The measuring unit 20 includes two opposite fixed side walls 27 and 28, and a movable side wall 24 which is movable between the two fixed side walls 27 and 28. The measuring unit 20 further includes a horizontal regulating rod 23 which has one end extending through the fixed side wall 28 and mounted to the movable side wall 24 and which is movable so as to move the movable side wall 24 between the two fixed side walls 27 and 28. The movable side wall 24 has an upper end formed with a horizontally extending panel 241 which extends along and above the regulating rod 23 to form an L-shape with the movable side wall 24. The regulating rod 23 is formed with an external screw thread and is provided with an internally threaded rotary knob 25 which is rotatably mounted to the fixed side wall 28 and which threadedly engages the external screw thread of the regulating rod 23. The rotary knob 25 is operable so as result in linear movement of the regulating rod 23. The fixed side wall 27 of the measuring unit 20 has an outer surface provided with a protrusion 26 that is formed with a central bore 261.

The control unit 30 is substantially rectangular in shape and has two open sides. The control unit 30 has a top wall 31, a bottom wall 32, and front and rear walls 33 and 34 which interconnect front and rear ends of the top and bottom walls 31 and 32. These walls 31, 32, 33 and 34 confine a capacity for accommodating the measuring unit 20. The top wall 31 is formed with a rectangular inlet opening 311 and extends slidably between the measuring unit 20 and the base plate 18. The bottom wall 32 is formed with a rectangular outlet opening 321 and extends slidably below the measuring unit 20. The inlet opening 311 and the outlet opening 321 are disposed adjacent to the rear and front ends, respectively. Each of the inlet opening 311 and the outlet opening 321 has a size corresponding to that of the opening 12 in the base plate 18. Each of the top wall 31 and the bottom wall 32 of the control unit 31 has an edge portion which is near the front side wall 33. The edge portion of the top wall is provided with a first limit projection 312. The edge portion of the bottom wall is provided with a second limit projection 322. The front side wall 33 of the control unit 30 is provided with a handle 35. The rear side wall 34 of the control unit 30 is provided with a horizontal engaging strip 36 which is formed with an engaging groove 361. The dispenser further includes a biasing spring 37 having a first end mounted to the bore 261 in the protrusion 26 of the measuring unit 20 and a second end hooked at the engaging groove 361 of the engaging strip 36 of the control unit 30.

The plate member 40 is mounted to the bottom side of the measuring unit 20 in such a manner that the bottom wall 32 of the control unit 30 is disposed between the plate member 40 and the measuring unit 20. The plate member 40 is substantially rectangular in shape and has four corners formed with four through holes 41. The plate member has a slot 42 formed therethrough and aligned with the outlet opening 321. The slot 42 has a size corresponding to that of the outlet opening 321. The plate member 40 cooperates with the measuring unit 20 so as to define a slide groove 45 for the bottom wall 32 of the control unit 30 to slide thereon. The plate member 40 has two opposite edge portions, each of which extends downwardly and bends inwardly so as to form a receiving groove 43. The guiding cup 44 has an open top end which has two opposite edges, each of which is formed with a rim portion 441. The rim portions 441 of the guiding cup 44 are received in the receiving groove 43 to couple the guiding cup 44 with the bottom side of the plate member 40. The guiding cup 44 has an open bottom end 442 and a downwardly inclined wall 443 for guiding the milk powder through the open bottom end 442 thereof.

To assemble the milk powder dispenser of this preferred embodiment, the milk powder measuring unit 20 is accommodated in the control unit 30 and the control unit 30 is slidably moved, with respect to the base unit 10 and the measuring unit 20, to a first position in which the inlet opening 311 thereof is aligned with the opening 12 in the base plate 18 and the retaining chamber 22 is registered with the inlet opening 311. The second end of the biasing spring 37 is hooked at the engaging groove 361 in the engaging strip 36. The plate member 40 is placed below the control unit 30 so that the four through holes 41 are registered with the four through holes 21 of the measuring unit 20, respectively, and with the four through holes 13 of the base plate 18, respectively. Four bolts 50, which pass upwardly through the through holes 41, 21 and 13, are used to mount the plate member 40 on the measuring unit 20, and to mount the measuring unit 20 on the base unit 10, thereby restricting the control unit 30 between the base unit 10 and the plate member 40. The rim portions 441 of the guiding cup 44 are then inserted into and received in the receiving grooves 43 in the plate member 40. Finally, the container 14 threadedly engages the base plate 18 of the base unit 10 and the removable cap 15 is capped on top of the container 14 to complete the assembly.

Figure 2:
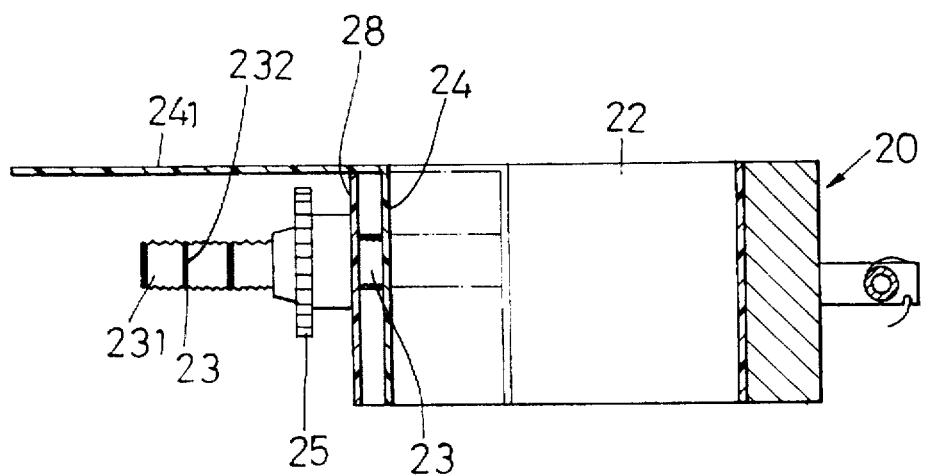
FIG. 2 is a cross-sectional schematic view illustrating operation of the regulating rod of the preferred embodiment of FIG. 1.
Figure 3:
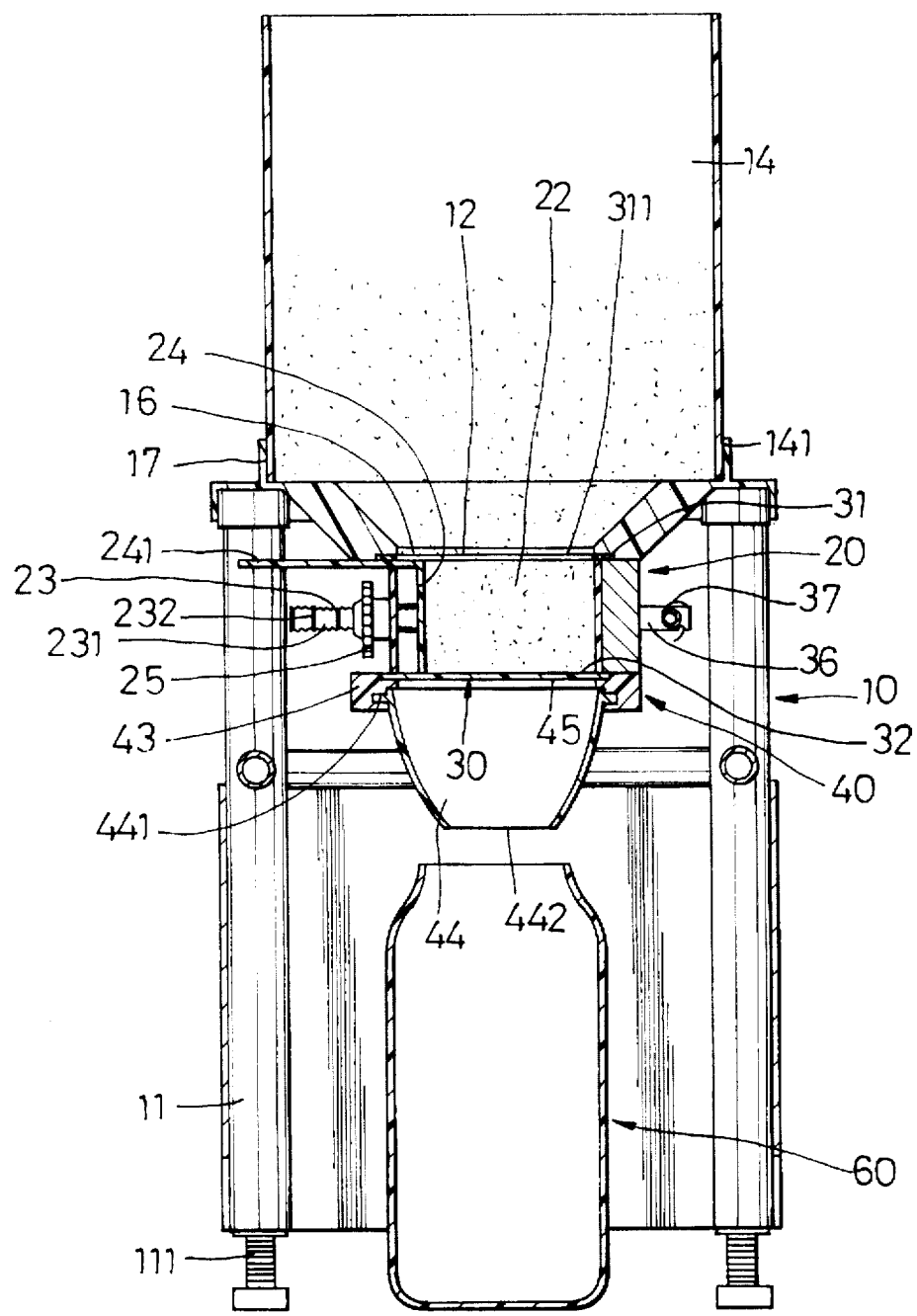
FIG. 3 is a cross-sectional view of the preferred embodiment of FIG. 1 when milk powder is poured into the container and retained in the retaining chamber.

To use the milk powder dispenser of the present invention, as shown in FIG. 2, the rotary knob 25 is rotated to regulate the size of the milk powder retaining chamber 22, thus determining the amount of the milk powder to be dispensed. Since the regulating rod 23 has one end fixed to the movable wall 24 and cannot rotate with the rotary knob 25, rotation of the rotary knob 25 will result in linear movement of the regulating rod 23. The movable wall 24 is moved to a predetermined position by moving the regulating rod 23, and the horizontally extending panel 241 thereof closes a part of the top end of the retaining chamber 22. The regulating rod 23 has a flat portion 231 formed with graduations 232. Since the regulating rod 23 is moved linearly, the relative positions of the rotary knob 25 and the graduations 232 are varied, and the amount of the milk powder to be dispensed can be read from the graduations 232. As shown in FIG. 3, the cap 15 (not shown) is removed and the milk powder is poured into the container 14. Since the inlet opening 311 in the top wall 31 of the control unit 30 is aligned with the opening 12 in the base unit 10, the milk powder falls from the base unit 10 through the opening 12 and the inlet opening 311 into the measuring chamber 22. In this situation, the bottom wall 32 of the control unit 30 closes the bottom end of the retaining chamber 22 to prevent leakage of the milk powder.

Figure 4:
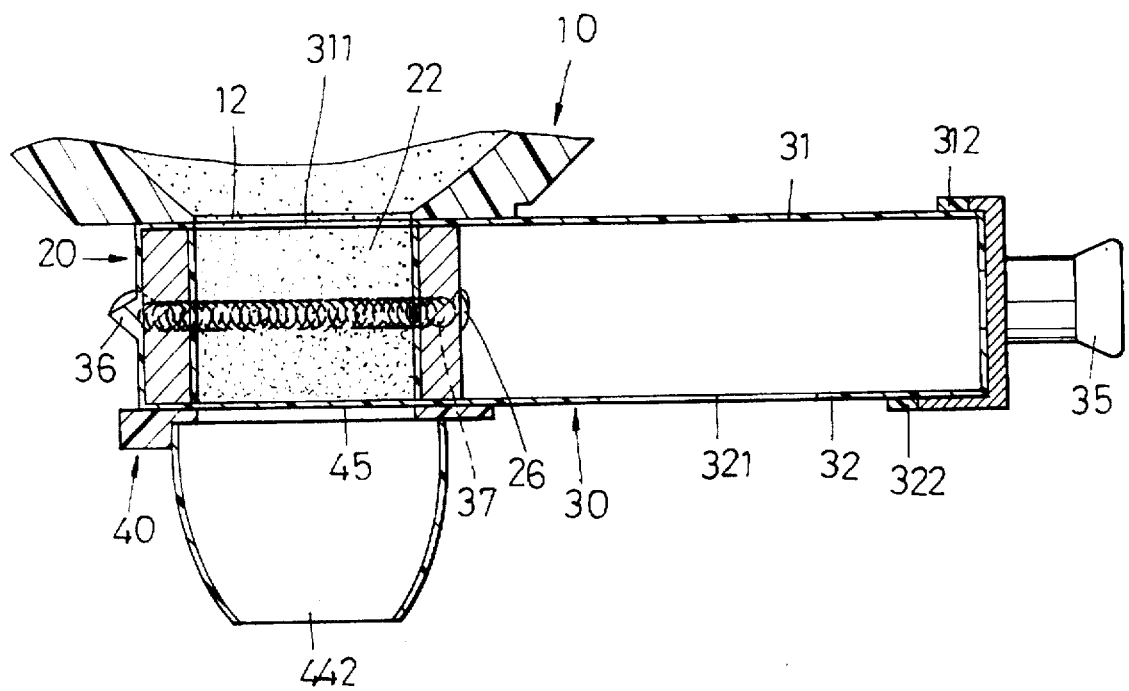
FIG. 4 is a cross-sectional schematic view illustrating the operation of the control unit of the preferred embodiment of FIG. 1 when the control unit is in the first position.
Figure 5:
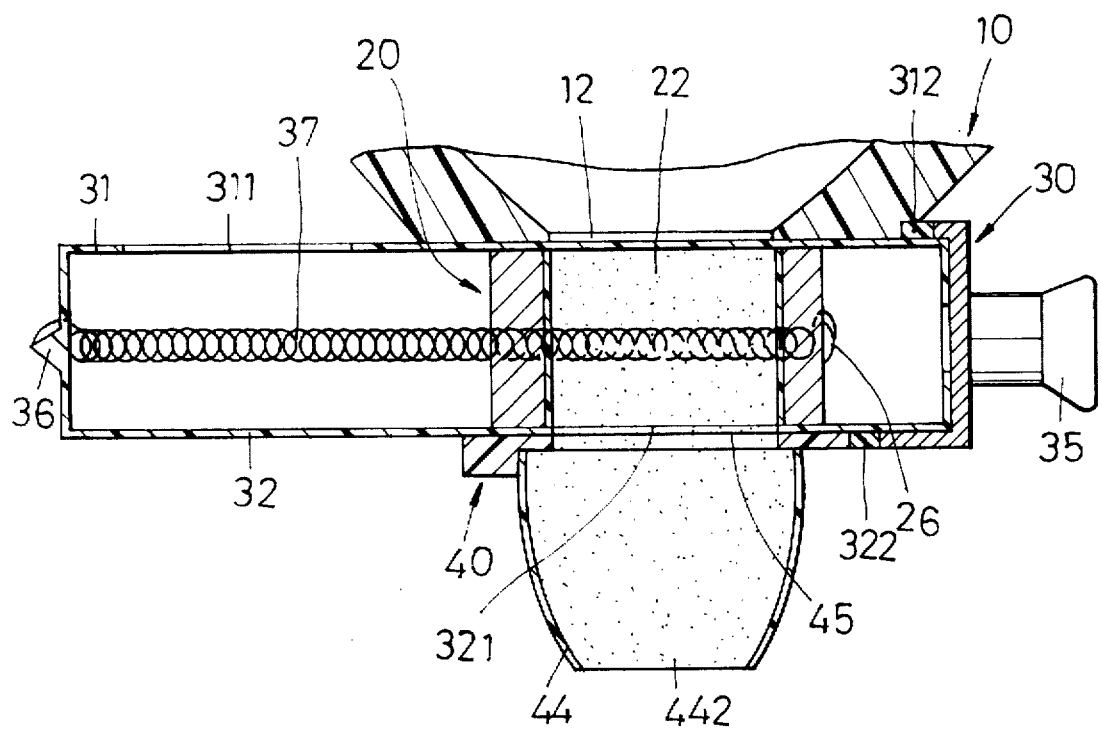
FIG. 5 is a cross-sectional schematic view of the control unit of the preferred embodiment of FIG. 1 when the control unit is in the second position.

Referring to FIGS. 4 and 5, to discharge the milk powder, the handle 35 is pushed rearwardly to move the control unit 30 such that the first limit projection 312 abuts against the bottom of the base unit 10 while the second limit projection 322 abuts against the plate member 40, thereby aligning the retaining chamber 22 precisely with the outlet opening 321 formed in the bottom wall 32 of the control unit 30. In this situation, the biasing spring 37 is tensioned and the top wall 31 closes the opening 12 to prevent the milk powder from falling down continuously into the retaining chamber 22. The milk powder retained in the retaining chamber 22 is then discharged from the outlet opening 321 and is guided by the guiding cup 44 through the open bottom end 442 thereof into a milk bottle 60 (which is shown in FIG. 2) provided below the guiding cup 44. Therefore, the milk powder will not be scattered on the table. After all of the milk powder retained in the retaining chamber 22 has been discharged, the handle 35 is released and the biasing spring 37 biases the control unit 30 back to the first position in which the retaining chamber 22 is aligned with the inlet opening 311 and the opening 12 in the base unit 10 and the bottom wall 32 closes the bottom end of the retaining chamber 22. The dispenser is now ready for subsequent use.

Referring again to FIG. 3, the screw rod 111 provided below each of the legs 11 are regulated for adjusting the height of the legs 11 in accordance with the height of the milk bottle 60 to achieve a best condition for use.

With the use of the milk powder dispenser, the milk powder can be dispensed precisely in a predetermined amount and will not be scattered on the table.

With this invention thus explained, it is apparent that numerous modifications and variations can be made without departing from the scope and spirit of this invention. It is therefore intended that this invention be limited only as indicated in the appended claims.

I claim:

1. A milk powder dispenser for dispensing a predetermined amount of milk powder, comprising:

a base unit including a horizontal base plate and a container for containing milk powder therein, said base plate having a middle portion formed with an opening, said container having an open bottom end connected axially to said base plate;

a milk powder measuring unit mounted on a bottom side of said base plate, said measuring unit confining a milk powder retaining chamber that is aligned with said opening in said base plate; and a control unit having a top wall, a bottom wall, and front and rear walls which interconnect front and rear ends of said top and bottom walls, respectively, said top wall being formed with an inlet opening and extending slidably between said measuring unit and said base plate, said bottom wall being formed with an outlet opening and extending slidably below said measuring unit, said inlet opening and said outlet opening being disposed adjacent to said rear and front ends, respectively, said control unit being movable relative to said base unit and said measuring unit between a first position in which said inlet opening is aligned with said opening in said base plate and said retaining chamber is registered with said inlet opening, and a second position in which said opening in said base plate is closed by said top wall and said retaining chamber is registered with said outlet opening, whereby, milk powder in said measuring unit is discharged from said outlet opening into a milk bottle provided below said base plate when said control unit is moved to said second position.

2. The dispenser according to claim 1, wherein said middle portion of said base plate is formed with a downwardly opening funnel section which confines said opening in said base plate.

3. The dispenser according to claim 2, wherein said funnel section of said base plate is formed with an upwardly protruding annular flange which is provided with an internal screw thread, said open bottom end of said container being formed with an external screw thread which engages said internal screw thread of said flange.

4. The dispenser according to claim 1, wherein said base unit includes leg means for supporting said base plate thereon, said leg means confining a space for placing the milk bottle therein.

5. The dispenser according to claim 4, wherein said leg means has a bottom end provided with at least one screw rod for adjusting height of said leg means.

6. The dispenser according to claim 1, wherein said container has an open top end which is provided with a removable cover.

7. The dispenser according to claim 1, wherein said measuring unit is mounted threadedly to said base plate.

8. The dispenser according to claim 1, wherein said measuring unit is substantially rectangular in shape and includes two opposite fixed side walls and a movable side wall movable between said fixed side walls, said measuring unit further including a horizontal regulating rod which has one end extending through one of said fixed side walls and mounted to said movable side wall, said regulating rod being movable so as to move said movable side wall between said two fixed side walls.

9. The dispenser according to claim 8, wherein said movable side wall has an upper end formed with a horizontally extending panel which extends along and above said regulating rod.

10. The dispenser according to claim 8, wherein said regulating rod is formed with an external screw thread and is provided with an internally threaded rotary knob which is operable so as to result in linear movement of said regulating rod.

11. The dispenser according to claim 10, wherein said regulating knob is formed with graduations, said linear movement of said regulating rod resulting in variation of relative positions of said rotary member and said graduations.

12. The dispenser according to claim 1, further including a plate member and a guiding cup, said plate member being mounted to said bottom side of said measuring unit and cooperating with said measuring unit so as to define a slide groove for said bottom wall of said control unit to slide thereon, said plate member having a slot formed therethrough and aligned with said outlet opening, said guiding cup being coupled to a bottom side of said plate member and having an open bottom end.

13. The dispenser according to claim 12, wherein said guiding cup has a downwardly inclined wall for guiding the milk powder through said open bottom end thereof.

14. The dispenser according to claim 1, further comprising a biasing spring having a first end mounted to said measuring unit and a second end mounted to said control unit, said biasing unit biasing said control unit towards said first position.

15. The dispenser according to claim 1, wherein said front side wall of said control unit is provided with a handle.

16. The dispenser according to claim 12, wherein each of said top wall and said bottom wall of said control unit has an edge portion which is near said front side wall and which is provided with a limit projection that abuts against a respective one of said base plate and said plate member to limit movement of said control unit towards said second position.

* * * * *